United States Patent
Harris et al.

(10) Patent No.: US 7,447,154 B2
(45) Date of Patent: Nov. 4, 2008

(54) METHOD TO FACILITATE DETERMINATION OF A DATA RATE

(75) Inventors: John M. Harris, Chicago, IL (US); Vijay G. Subramanian, Chicago, IL (US)

(73) Assignee: Motorola, Inc., Schaumburg, IL (US)

(*) Notice: Subject to any disclaimer, the term of this patent is extended or adjusted under 35 U.S.C. 154(b) by 697 days.

(21) Appl. No.: 10/999,541

(22) Filed: Nov. 30, 2004

(65) Prior Publication Data

US 2006/0114827 A1 Jun. 1, 2006

(51) Int. Cl.
*H04L 1/00* (2006.01)
(52) U.S. Cl. ...................................................... 370/232
(58) Field of Classification Search ................ None
See application file for complete search history.

(56) References Cited

U.S. PATENT DOCUMENTS

| | | | |
|---|---|---|---|
| 6,229,795 B1 * | 5/2001 | Pankaj et al. ................ 370/329 |
| 6,694,147 B1 * | 2/2004 | Viswanath et al. ........... 455/517 |
| 6,987,738 B2 * | 1/2006 | Subramanian et al. ....... 370/252 |
| 7,046,678 B2 * | 5/2006 | Jiang et al. .............. 370/395.41 |
| 2002/0102982 A1 | 8/2002 | Chaponniere et al. |
| 2003/0039213 A1 | 2/2003 | Holtzman et al. |
| 2003/0099249 A1 | 5/2003 | Heijenk |

OTHER PUBLICATIONS

Agrawal et al, Class and Channel Condition Based Scheduler for EDGE/GPRS, SPIE, vol. 4531, pp. 59-69, 2001.*
Jiang et al, Channel Quality Dependent Scheduling for Flexible Wireless Resource Management, IEEE, pp. 3633-3638, 2001.*

* cited by examiner

*Primary Examiner*—Frank Duong

(57) ABSTRACT

A process (10) to facilitate determination of a particular data rate to use when communicating data with respect to a mobile station comprises providing (11) historical information regarding past radio frequency channel conditions, data quantity information (12) as corresponds to a current data file to be transmitted, and assessing (13) historical data transmission as correspond to the mobile station. One then selects (14) a data rate as a function of such information. In a preferred embodiment, this comprises varying a time scaling factor as a function of relative data file size, which time scaling factor serves to influence the extent to which past history serves to otherwise influence the selection of a particular data rate.

13 Claims, 1 Drawing Sheet

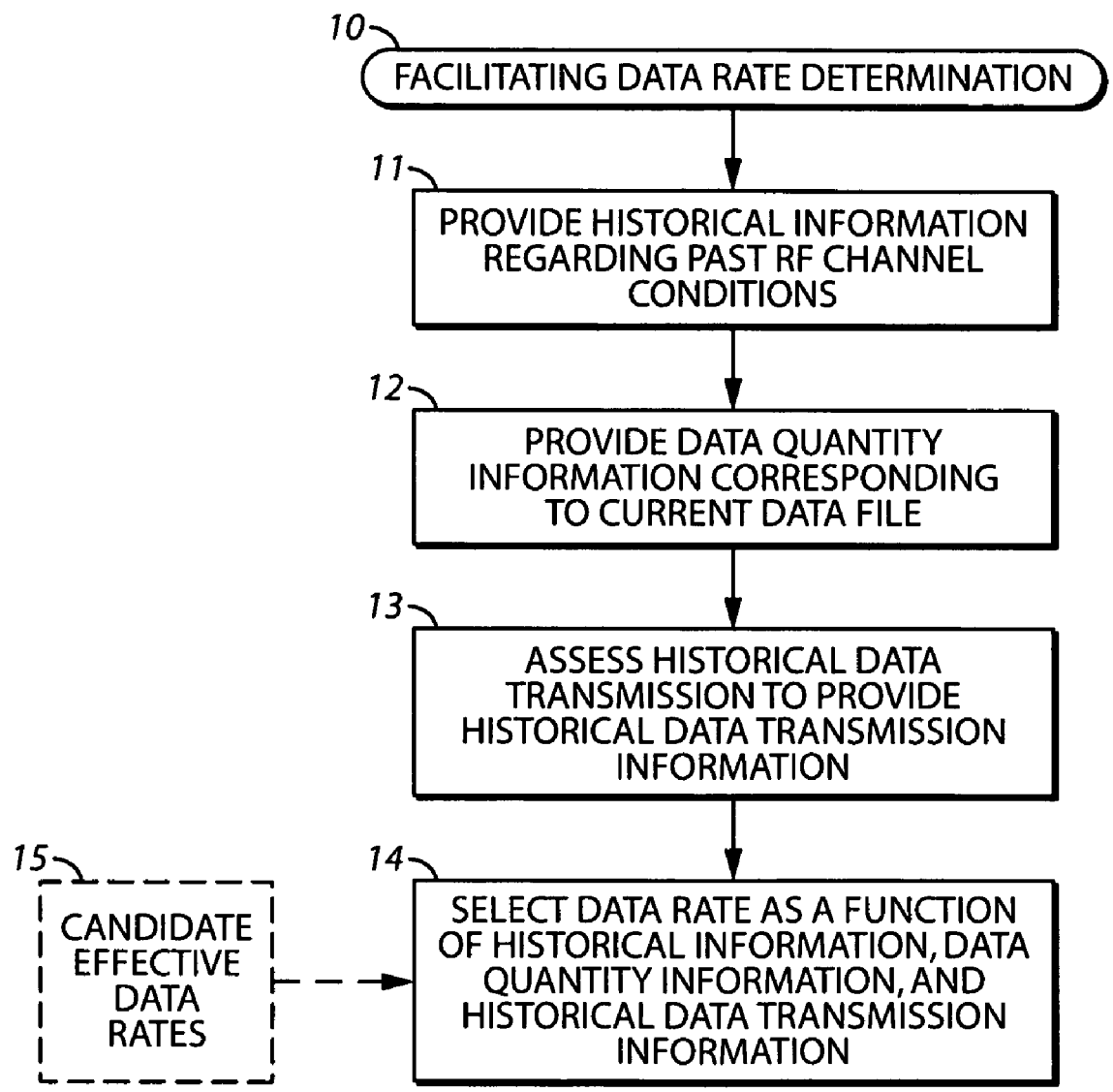

METHOD TO FACILITATE DETERMINATION OF A DATA RATE

TECHNICAL FIELD

This invention relates generally to data communications and more particularly to effective data rates.

BACKGROUND

Communication systems of various kinds, including wireless communication systems, are known. In many cases such communication systems support the conveyance of data, often by employing packetized services. For various reasons (relating sometimes to the nature of the service itself and sometimes to an anecdotal context) the quantity of data to be transmitted to or by a given system participant can and will vary widely. For example, in a typical wireless communication system, file sizes can readily vary in size from 0.5 KB or smaller to 1 MB and larger. The amount of time required to successfully convey such data will therefore usually vary as well. For example, when the wireless channel supports an 8 KBPS data rate, roughly 500 milliseconds are required to transmit a 0.5 KB file while roughly 1,000 seconds are required to transmit a 1 MB file. (Faster effective data rates will reduce these numbers, but a differential spread will still persist. For example, when a wireless channel supports a 40 KBPS data rate, the 0.5 KB file will typically require roughly 100 milliseconds and the 1 MB file will require roughly 200 seconds.)

Reception conditions in a wireless system can vary greatly over time and with respect to location (other factors can also play a part). Some communication systems have an ability to make a dynamic selection of a particular data rate to use when supporting the conveyance of data. One particularly successful example is found at US 2002/0147022 entitled Method for good Packet Scheduling and Radio Resource Allocation in a Wireless Communication System (the contents of which are incorporated herein by this reference). This approach permits a fairness parameter $\beta$ to be employed. Generally speaking, this approach provides for the detection of radio frequency resource usage and a given data rate is then increased or decreased as a function of determined resource requirements in an attempt to achieve a fairer balance of services.

For example, the data rate in a given instance will typically be increased when assigned to communications that require less power, Walsh Code legs, or other relevant communication resource (with respect to a reference). The fairness parameter $\beta$ can be varied (by a system administrator, for example) to influence the amount by which a data rate increases or decreases in this manner. In effect, this permits a system administrator to influence the extent to which communications units experiencing poor channel conditions receive correspondingly reduced data rates in order to increase total effective system throughput.

More particularly, the above-described approach uses both an instantaneous radio frequency environment measure and a radio frequency environment average over a longer time scale (typically influenced by a time scale factor $\square$) to determine the data rate to be assigned. As a result, when the instantaneous radio frequency environment is poor but the longer-term average is good, a reduced data rate will typically be assigned due to an increased likelihood that the radio frequency environment will improve in the near future. When, however, the instantaneous radio frequency is poor and the longer-term average is also poor, then a more normal data rate will typically be assigned because it is less likely that the radio frequency environment will improve anytime soon. (Note: A smaller $\square$ (closer to 0) implies a longer/larger time-scale and a larger $\square$ (closer to 1) implies a shorter/smaller time-scale.)

This prior art approach in fact works well for many applications and under many operational circumstances. There are situations, however, when this approach can yield less than optimal results. For example, when applying this approach, communications involving only a relatively small quantity of data may be unduly impacted. Since larger files typically require a commensurately longer period of time to effect their complete transmission, this prior art approach works quite well. Smaller files, however, typically entail a shorter file transfer time. As a result, the above approach, with its reliance upon a long-term average analysis, can unduly skew data rate allocation in a way that can adversely impact such transactions.

In particular, a reduced data rate can be assigned to facilitate the transmission of a small data file based upon a presumption that channel conditions will improve in the near future and therefore likely permit a subsequent up tick in the applied data rate. Because of the small size of the data file, however, the data communication will often be completed before such improvement to channel conditions occurs. As a result, the entire transaction is burdened by application of an intentionally reduced data rate.

BRIEF SUMMARY OF THE INVENTION

To address the above-mentioned need a method to facilitate determination of a data path for use when communicating data with respect to a mobile station is provided herein. In an embodiment, The disclosed method includes providing historical information regarding past radio frequency channel conditions as correspond to the mobile station and providing data quantity information as corresponds to a current data file to be communicated with respect to the mobile station. The method also includes assessing at least one historical data transmission as pertains to the mobile station to provide historical data transmission information. In addition, the method includes selecting at least one time scale factor to use when selecting at least one data rate to use when communicating the data as a function, at least in part, of both the historical information and the data quantity information.

In another embodiment the method includes providing historical information regarding past radio frequency channel conditions as corresponds to the mobile station and providing data quantity information as corresponds to a current data file to be communicated and an amount of the current data file that has already been so communicated with respect to the mobile station. In addition, the method includes assessing at least one historical data transmission as pertains to the mobile station to provide historical data transmission information. The method also includes selecting at least one time scale factor to use when selecting at least one data rate to use when communicating the data as a function, at least in part, of the historical information, the data quantity information, and the historical data transmission information.

BRIEF DESCRIPTION OF THE DRAWINGS

The above needs are at least partially met through provision of the method to facilitate determination of a data rate described in the following detailed description, particularly when studied in conjunction with the drawing, comprises a flow diagram as configured in accordance with various embodiments of the invention.

Skilled artisans will appreciate that steps in the FIGURE are illustrated for simplicity and clarity. Also, common but well-understood steps or elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

Generally speaking, pursuant to these various embodiments, as assessment regarding the quantity of data to be conveyed in a given instance permits the time scale applied in the above-described process to be dynamically altered to permit different treatment for different data conveyance transactions. When dealing with larger quantities of data, a longer time scale □ as governs the relative calculation of the longer-term channel condition remains viable. When dealing with smaller quantities of data, however, this time scale can be reduced (or the fairness concept β otherwise altered) to permit the use of less adversely impacted data rates when servicing smaller quantities of data.

Pursuant to a preferred approach, this can entail the provision of historical information regarding past radio frequency channel conditions as correspond to a given mobile station as well as providing data quantity information as corresponds to a current data file to be communicated with respect to that mobile station. By then assessing at least one historical data transmission as pertains to the mobile station to then also provide historical data transmission information for that mobile station, one can select a data rate to use when communicating such data as a function, at least in part, of the historical information, the data quantity information, and the historical data transmission information.

So configured, the prior art benefits as described earlier are retained while also better tending to ensure that smaller data transactions are not unduly impacted.

These and other benefits may become more evident upon making a thorough review and study of the following detailed description. Referring now to the drawing, this FIGURE depicts a process 10 to facilitate the determination of a data rate for use when communicating data with respect to a mobile station (wherein the mobile station receives the data and/or itself transmits the data). The mobile station can utilize any of a wide variety of presently known and likely hereafter-developed communication technologies and methodologies to effect the desired communication. As such technologies and methodologies are well understood in the art, and further as these teachings are not particularly sensitive to selection of any particular such approach, further elaboration regarding such technologies and methodologies will not be provided here for the sake of brevity and the preservation of focus.

Pursuant to this process 10, and consistent, at least to an extent, with prior art practice, one provides 11 historical information regarding past radio channel conditions as corresponds to the mobile station. Such historical information can vary widely from system to system. For example, when the communication medium comprises a channel that includes one or more pilot signals, the historical information can comprise data regarding the relative strength of such pilot signals at various points in time. Other kinds of information regarding the quality of communication medium can also be used as available in a given application and setting. In a preferred approach, this historical information will include both relatively near term channel conditions as well as older data. The relatively near term information tends to be useful under a variety of operating conditions while the older data will often be useful when determining a data rate to allocate when supporting transmission of a relatively large quantity of data.

This process 10 also supports provision 12 of data quantity information as corresponds to a current data file to be communicated with respect to the mobile station. Again, this may correspond to a data file to be transmitted by, or to, the mobile station in question. There are various ways to facilitate the provision of such data quantity information. In some cases, the information may be directly available and/or can be made available. For example, the network element seeking to transmit the data file may provide at least one parameter that expressly (or indirectly) relates to the quantity of current data to be communicated. Such a parameter might comprise a part of a file name for the current data file to be transmitted (for example, a file name such as "filename.57K" might be appropriately parsed to ascertain that the file in question comprises 57 KB of data, with numerous other naming conventions being possible and potentially useful in such service).

Such a parameter might also comprise a part of a data session request and/or a corresponding data session negotiation. (Those skilled in the art will also recognize that there are various ways by which the size of a given data file can be ascertained. As but one illustrative example, when the application in question utilizes File Transfer Protocol (FTP) (which itself, roughly speaking, comprises the basis for the ubiquitous HyperText Transport Protocol) the application can utilize the *ls* process to readily determine the file size prior to downloading/uploading.)

In some settings specific information regarding the quantity of data to be transmitted may not be conveniently available. It may still nevertheless be possible to develop at some sense of the likely size of the file to be communicated. As one example, the corresponding application may be known or ascertainable (that is, the file type may itself tend to identify the application used to create and/or utilize the file). In such a case, this provision 12 of data quantity information can comprise utilizing statistical information regarding typical file sizes as correspond to this application. To illustrate, a first application might be characterized by an average file size of 35 KB while a second application might be characterized by an average file size of 1.2 MB (where such statistics are obtained from an external source such as a server that monitors transactions and develops such information and/or from an internal source that develops such statistics using local observations). Such information could be utilized, pursuant to these teachings, to serve as a useful indication of the possible and/or likely quantity of data as comprises the current data file to be transmitted.

This process 10 then preferably assesses 13 at least one historical data transmission as pertains to the mobile station to provide resultant historical data transmission information. This assessment 13 can encompass a single such event or, more preferably, can comprise assessing a plurality of historical data transmissions as pertain to the mobile station. In a preferred approach, this assessment 13 comprises determining and/or using information that corresponds to a size of the at least one historical data transmission. This information, in turn, can provide a useful indicator of the likely data transmission behaviors that characterize the mobile station. In situations where there is no other discrete objective indicator of the present quantity of data to be transmitted and/or there is no application-based information of like kind, this unique-to-the-mobile station historical information can serve as a potentially reliable substitute.

Furthermore, even when the other information is available, this mobile station specific historical view may nevertheless provide a useful context by which to assess the other information. As one example, though the application as corresponds to such a file type may ordinarily average out at around 400 KB, the specific history for a given mobile station may indicate that its files tend more towards an average of 75 KB. As another example, the history for a given mobile station may indicate that a given mobile tends to deal in multiple file transactions. This, in turn, can lead to an understanding, for example, that a first file tends to be relatively small while the succeeding files tend to be considerably larger. Such information is readily leveraged pursuant to these teachings.

Additionally, the method may use knowledge of general file size distribution as tends to characterize a given system, subscriber, application, or the like. Generally, data files have a heavy tailed distribution, which generally possesses the decreasing hazard rate property. Accordingly, and in general, the longer a given file has lasted thus far, the longer one can expect to last in the future. For example, when one knows that a current data file is at least 1 KB because at least that amount of data has already been communicated, the expected size of that data file is smaller than if one knows that the corresponding download so far is at least 20 KB. Accordingly, one can select a given data rate to use when communicating a given data file as a function, at least in part, of an amount of that data file that has already been communicated. In general, the greater the amount of the file transferred at any point in time, the greater the likelihood that this particular file comprises a relatively large data file.

Accordingly, when more than a predetermined amount of a current data file has already been communicated, a data rate to be used when subsequently supporting that communication can be selected using a data rate selection process that makes use of a relatively long time scale factor. Conversely, when less than a predetermined amount of the current data file has already been communicated, a data rate to be used when subsequently supporting that communication can be selected through use of a data selection process that makes use of a relatively short time scale factor.

In some instances, there may only be two (or a few) possible file sizes as used in a given system, for a given subscriber, and/or with respect to a particular application. To illustrate, in a given setting, only 1 KB files and 81 MB files may be utilized. In such a setting, one might begin a file transfer with a relatively slow data rate. Once the amount of data communicated exceeds the 1 KB point, however, one can conclude that the file is over 1 KB length, and the data rate selection process can begin using a longer time scale factor to thereby influence selection of a higher throughput data rate to use when communicating the remaining portions of this particular data file. So configured, it will be understood and appreciated that useful and informed data rate selections can be effected even in the absence of a priori information regarding the specific size of a data file to be communicated.

This process 10 then facilitates the selection 14 of at least one data rate to use when communicating the data as a function, at least in part, of the historical information, the data quantity information, and the historical data transmission information. In a typical embodiment this can comprise selecting a particular data rate from amongst a plurality of available candidate effective data rates 15. (Those skilled in the art will recognize and understand that a particular effective data rate can be achieved in a wide variety of ways, including but not limited to use of various modulation techniques, various coding and/or compression schemes, various bandwidth allocations, various processing gains, various spreading factors, and so forth. These teachings are generally applicable to all such mechanisms including those presently known and understood and likely those developed in the future.)

In a preferred embodiment, this selection of a given data rate occurs as a function, at least in part, of selection of a particular time scaling factor (such as the time scaling factor ☐ as is used in the above-described prior art process). More particularly, in a preferred approach, selection of a particular time scaling factor itself occurs as a function, at least in part, of both the above-described historical information and the data quantity information. So configured, and pursuant to a preferred approach, this process 10 favors use of a relatively larger time scaling factor (and hence use of a relatively deeper historical view) when the data quantity information corresponds to a relatively larger quantity of data and use of a relatively smaller time scaling factor (and hence a more relatively limited and preferably more recent historical view) when the data quantity information corresponds to a relatively smaller quantity of data. The precise amounts by which such a time scaling factor is altered from some norm can and will vary from system to system and likely in accordance with a given system administrator's notions of system needs, requirements, and sense of fairness.

So configured, a prior art process such as that described earlier can be modified to provide improved service for a wider variety of users and operating circumstances. A wide variety of file sizes can be readily accommodated in a dynamic and effective manner without unduly sacrificing system throughput requirements and/or individual user quality of service experiences.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method to facilitate determination of a particular data rate for use when communicating data with respect to a mobile station, comprising:
   providing historical information regarding past radio frequency channel conditions as correspond to the mobile station;
   providing data quantity information as corresponds to a current data file to be communicated with respect to the mobile station;
   assessing at least one historical data transmission as pertains to the mobile station to provide historical data transmission information;
   selecting at least one time scale factor to use when selecting at least one data rate to use when communicating the data as a function, at least in part, of both the historical information and the data quantity information.

2. The method of claim 1 wherein providing data quantity information as corresponds to current data to be communicated further comprises providing data quantity information as corresponds to current data to be communicated to the mobile station.

3. The method of claim 1 wherein providing data quantity information as corresponds to current data to be communicated further comprises providing data quantity information as corresponds to current data to be communicated by the mobile station.

4. The method of claim 1 wherein assessing at least one historical data transmission as pertains to the mobile station further comprises assessing a plurality of historical data transmissions as pertain to the mobile station.

5. The method of claim 1 wherein assessing at least one historical data transmission as pertains to the mobile station further comprises using information that corresponds to a size of the at least one historical data transmission.

6. The method of claim 1 wherein providing data quantity information as corresponds to current data to be communicated further comprises assessing at least one historical data transmission as pertains to an application as corresponds to the mobile station.

7. The method of claim 6 wherein assessing at least one historical data transmission as pertains to an application further comprises assessing at least one historical data transmission as pertains to at least a second mobile station that is different than the mobile station, which second mobile station employed the application.

8. The method of claim 1 wherein assessing at least one historical data transmission as pertains to the mobile station further comprises providing at least one parameter that expressly relates to quantity of the current data to be communicated.

9. The method of claim 8 wherein providing at least one parameter further comprises providing the at least one parameter as a part of at least one of:
   a file name;
   a data session request;
   a data session negotiation.

10. The method of claim 1 wherein selecting a time scaling factor as used by a data rate selection process as a function, at least in part, of both the historical information and the data quantity information further comprises:
    using a larger time scaling factor when the data quantity information corresponds to a larger quantity of data;
    using a smaller time scaling factor when the data quantity information corresponds to a smaller quantity of data.

11. A method to facilitate determination of a particular data rate for use when communication data with respect to a mobile station, comprising:
    providing historical information regarding past radio frequency channel conditions as corresponds to the mobile station;
    providing data quantity information as corresponds to a current data file to be communicated and an amount of the current data file that has already been so communicated with respect to the mobile station;
    assessing at least one historical data transmission as pertains to the mobile station to provide historical data transmission information;
    selecting at least one time scale factor to use when selecting at least one data rate to use when communicating the data as a function, at least in part, of the historical information, the data quantity information, and the historical data transmission information.

12. The method of claim 11 wherein selecting at least one time scale factor to use when selecting at least one data rate to use when communicating the data as a function, at least in part, of the data quantity information farther comprises selecting a relatively long time scale factor as used by a data rate selection process when more than a predetermined amount of the current data file has already been transmitted.

13. The method of claim 11 wherein selecting at least one time scale factor to use when selecting at least one data rate to use when communicating the data as a function, at least in part, of the data quantity information farther comprises selecting a relatively short time scale factor as used by a data rate selection process when less than a predetermined amount of the current data file has already been transmitted.

* * * * *